United States Patent
Shojaeifard et al.

(10) Patent No.: US 11,039,388 B2
(45) Date of Patent: Jun. 15, 2021

(54) CELLULAR TELECOMMUNICATIONS NETWORK

(71) Applicant: British Telecommunications Public Limited Company, London (GB)

(72) Inventors: Arman Shojaeifard, London (GB); Richard MacKenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/941,677

(22) Filed: Jul. 29, 2020

(65) Prior Publication Data
US 2021/0037458 A1   Feb. 4, 2021

(30) Foreign Application Priority Data

Jul. 29, 2019  (EP) .................................... 19188772
Jul. 29, 2019  (GB) .................................... 1910781

(51) Int. Cl.
*H04W 52/02*  (2009.01)
*G06K 9/00*  (2006.01)
(Continued)

(52) U.S. Cl.
CPC .... *H04W 52/0206* (2013.01); *G06K 9/00664* (2013.01); *H04W 36/0077* (2013.01); *H04W 36/32* (2013.01); *H04W 92/20* (2013.01)

(58) Field of Classification Search
None
See application file for complete search history.

(56) References Cited

U.S. PATENT DOCUMENTS 8,358,624 B1   1/2013  Ghaus et al.
8,903,402 B2  12/2014  Guo et al.
(Continued)

FOREIGN PATENT DOCUMENTS

CN   102387590 A   3/2012
CN   105611554 A   5/2016
(Continued)

OTHER PUBLICATIONS

European Search Report, Application No. 19188772.8, dated Jan. 17, 2020, 5 pages.
(Continued)

*Primary Examiner* — Rebecca E Song
(74) *Attorney, Agent, or Firm* — Patterson Thuente Pedersen, P.A.

(57) ABSTRACT

This disclosure provides a method, and a network node for implementing the method, of switching a base station in a cellular telecommunications network between a first and second mode, in which the base station uses more energy when operating in the first mode than the second mode, wherein the cellular telecommunications network further includes a User Equipment, UE, having a camera, the method including storing visual data including a visual representation of at least a part of the base station; receiving visual data captured by the camera of the UE; performing a computer vision operation, trained on the stored visual data, on the captured visual data to determine whether the visual representation of the base station or part thereof is present in the captured visual data; and, in response initiating a switch in the base station between the first and second modes.

4 Claims, 13 Drawing Sheets

(51) Int. Cl.
*H04W 36/32* (2009.01)
*H04W 36/00* (2009.01)
*H04W 92/20* (2009.01)

(56) References Cited

U.S. PATENT DOCUMENTS

| | | | |
|---|---|---|---|
| 9,210,691 B2 | 12/2015 | Ponukumati et al. |
| 9,215,629 B2 | 12/2015 | Hapsari et al. |
| 9,301,105 B2 | 3/2016 | Kim et al. |
| 9,392,420 B2 | 7/2016 | Fodor et al. |
| 9,439,137 B2 | 9/2016 | Kim et al. |
| 9,811,915 B2 | 11/2017 | Stephenne |
| 9,883,436 B2 | 1/2018 | Brown et al. |
| 9,998,966 B2 | 6/2018 | Junichi |
| 10,123,241 B2 | 11/2018 | Brown et al. |
| 10,405,280 B2 | 9/2019 | Mackenzie et al. |
| 2002/0187780 A1 | 12/2002 | Souissi |
| 2005/0048972 A1 | 3/2005 | Dorenbosch et al. |
| 2007/0057843 A1 | 3/2007 | Chang et al. |
| 2008/0112364 A1 | 5/2008 | Kwon et al. |
| 2008/0293394 A1 | 11/2008 | Silver et al. |
| 2009/0109241 A1* | 4/2009 | Tsujimoto ............... H04N 7/18 345/633 |
| 2009/0219888 A1 | 9/2009 | Chen et al. |
| 2010/0120447 A1 | 5/2010 | Anderson et al. |
| 2010/0157911 A1 | 6/2010 | Hegde et al. |
| 2010/0178912 A1 | 7/2010 | Gunnarsson et al. |
| 2010/0291924 A1 | 11/2010 | Antrim et al. |
| 2011/0143805 A1 | 6/2011 | Ramasamy et al. |
| 2011/0190027 A1 | 8/2011 | Michel et al. |
| 2011/0217979 A1 | 9/2011 | Nas |
| 2011/0274030 A1 | 11/2011 | Wang et al. |
| 2011/0281582 A1 | 11/2011 | Jiang |
| 2012/0002537 A1 | 1/2012 | Bao et al. |
| 2012/0021744 A1 | 1/2012 | Chin et al. |
| 2012/0026865 A1 | 2/2012 | Fan et al. |
| 2012/0122515 A1 | 5/2012 | Han et al. |
| 2012/0157095 A1 | 6/2012 | Fodor et al. |
| 2012/0236828 A1 | 9/2012 | Hapsari et al. |
| 2012/0257495 A1 | 10/2012 | Schwarz et al. |
| 2012/0264418 A1 | 10/2012 | Lee et al. |
| 2012/0275315 A1 | 11/2012 | Schlangen et al. |
| 2013/0005340 A1 | 1/2013 | Drazynski et al. |
| 2013/0035033 A1 | 2/2013 | Sanneck et al. |
| 2013/0084873 A1 | 4/2013 | Sharony et al. |
| 2013/0130670 A1 | 5/2013 | Samdanis et al. |
| 2013/0150044 A1 | 6/2013 | Zhang et al. |
| 2013/0170435 A1 | 7/2013 | Dinan |
| 2013/0223230 A1 | 8/2013 | Swaminathan et al. |
| 2013/0237245 A1 | 9/2013 | Tinnakornsrisuphap et al. |
| 2013/0242720 A1 | 9/2013 | Chou |
| 2013/0260768 A1 | 10/2013 | Guo et al. |
| 2013/0267229 A1 | 10/2013 | Gopalakrishnan |
| 2013/0303240 A1 | 11/2013 | Sanka et al. |
| 2014/0018057 A1 | 1/2014 | Yu et al. |
| 2014/0038593 A1 | 2/2014 | Kim et al. |
| 2014/0050135 A1 | 2/2014 | Zhang et al. |
| 2014/0066069 A1 | 3/2014 | Salami et al. |
| 2014/0071891 A1 | 3/2014 | Zhou et al. |
| 2014/0071943 A1 | 3/2014 | Lee et al. |
| 2014/0092765 A1 | 4/2014 | Agarwal et al. |
| 2014/0114568 A1 | 4/2014 | Park |
| 2014/0126562 A1 | 5/2014 | Gunnarsson et al. |
| 2014/0187236 A1 | 7/2014 | Chiang et al. |
| 2014/0187243 A1 | 7/2014 | Rune et al. |
| 2014/0233449 A1 | 8/2014 | Laroia et al. |
| 2014/0269547 A1 | 9/2014 | Valliappan et al. |
| 2014/0286218 A1 | 9/2014 | Park et al. |
| 2014/0341184 A1 | 11/2014 | Dhanda et al. |
| 2014/0364114 A1 | 12/2014 | Zhao |
| 2014/0378129 A1 | 12/2014 | Jiang et al. |
| 2015/0063136 A1 | 3/2015 | Shen et al. |
| 2015/0092552 A1 | 4/2015 | Bajj et al. |
| 2015/0097731 A1 | 4/2015 | Russell |
| 2015/0131524 A1 | 5/2015 | Cavalcante et al. |
| 2015/0139015 A1 | 5/2015 | Kadous et al. |
| 2015/0271714 A1 | 9/2015 | Shetigar et al. |
| 2015/0296364 A1 | 10/2015 | Peruru et al. |
| 2015/0312769 A1 | 10/2015 | Shindo |
| 2015/0334604 A1 | 11/2015 | Banks et al. |
| 2015/0358940 A1 | 12/2015 | Zhang et al. |
| 2016/0021660 A1 | 1/2016 | Krishnamurthy |
| 2016/0029281 A1 | 1/2016 | Zhou et al. |
| 2016/0057699 A1 | 2/2016 | Jang |
| 2016/0088493 A1 | 3/2016 | Byun et al. |
| 2016/0095036 A1 | 3/2016 | Stojanovski et al. |
| 2016/0150420 A1 | 5/2016 | Byun et al. |
| 2016/0174149 A1 | 6/2016 | Byun et al. |
| 2016/0183281 A1 | 6/2016 | Yeh et al. |
| 2016/0192177 A1 | 6/2016 | Kim et al. |
| 2016/0205605 A1 | 7/2016 | Krishnamurthy |
| 2016/0249233 A1 | 8/2016 | Murray et al. |
| 2016/0255529 A1 | 9/2016 | Zhang et al. |
| 2016/0262200 A1 | 9/2016 | Su |
| 2016/0295439 A1 | 10/2016 | Yang et al. |
| 2017/0055186 A1 | 2/2017 | Donepudi et al. |
| 2017/0064531 A1* | 3/2017 | Stephenne ......... G06K 9/00785 |
| 2017/0086181 A1 | 3/2017 | Briggs |
| 2017/0094628 A1 | 3/2017 | Miao et al. |
| 2017/0127217 A1 | 5/2017 | Miao et al. |
| 2017/0265112 A1* | 9/2017 | Morita ................. H04W 36/24 |
| 2017/0303188 A1 | 10/2017 | Fitch et al. |
| 2017/0318526 A1 | 11/2017 | Wang et al. |
| 2017/0332301 A1 | 11/2017 | Horn et al. |
| 2017/0347298 A1 | 11/2017 | Brown et al. |
| 2018/0054840 A1 | 2/2018 | Fitch et al. |
| 2018/0138958 A1 | 5/2018 | Henrik |
| 2018/0160377 A1 | 6/2018 | Abramsky |
| 2018/0262922 A1 | 9/2018 | Mackenzie et al. |
| 2018/0270783 A1 | 9/2018 | Venkatraman |
| 2018/0309499 A1* | 10/2018 | Matsutaka ............ H04W 48/16 |
| 2018/0376275 A1 | 12/2018 | Jiang |
| 2019/0028983 A1 | 1/2019 | Mackenzie et al. |
| 2019/0053296 A1* | 2/2019 | Balappanavar ....... H04W 36/32 |
| 2019/0098582 A1 | 3/2019 | Mackenzie et al. |
| 2019/0261267 A1 | 8/2019 | Mackenzie |
| 2019/0313329 A1 | 10/2019 | Mackenzie |
| 2019/0364480 A1 | 11/2019 | Mehran et al. |
| 2020/0029275 A1 | 1/2020 | Mackenzie |
| 2020/0106516 A1 | 4/2020 | Mehran |
| 2020/0169997 A1 | 5/2020 | Diaz Sendra |
| 2020/0236595 A1 | 7/2020 | Ramirez |
| 2020/0236603 A1 | 7/2020 | Ramirez |
| 2020/0351770 A1 | 11/2020 | Mackenzie |

FOREIGN PATENT DOCUMENTS

| | | |
|---|---|---|
| CN | 108495360 | 9/2018 |
| EP | 2154917 A1 | 2/2010 |
| EP | 2271142 A1 | 1/2011 |
| EP | 2375807 A1 | 10/2011 |
| EP | 2434816 A2 | 3/2012 |
| EP | 2533571 A1 | 12/2012 |
| EP | 2663131 A1 | 11/2013 |
| EP | 2814279 A1 | 12/2014 |
| EP | 2814292 A1 | 12/2014 |
| EP | 2857798 A1 | 4/2015 |
| EP | 2750444 A4 | 5/2015 |
| EP | 2916584 A1 | 9/2015 |
| EP | 2928225 A1 | 10/2015 |
| EP | 2975886 A1 | 1/2016 |
| EP | 2991242 A1 | 3/2016 |
| EP | 3065438 A1 | 9/2016 |
| EP | 3518587 A1 | 7/2019 |
| GB | 2554544 | 4/2018 |
| GB | 2559556 | 8/2018 |
| GB | 2559731 A | 8/2018 |
| GB | 2560754 A | 9/2018 |
| GB | 2560899 A | 10/2018 |
| JP | 2993087 B2 | 12/1999 |
| JP | 2001209891 A | 8/2001 |
| JP | 2013120086 | 6/2013 |
| JP | 2016032133 | 3/2016 |
| JP | 2018148297 | 9/2018 |

(56) References Cited

FOREIGN PATENT DOCUMENTS

| | | |
|---|---|---|
| KR | 20100131025 A | 12/2010 |
| KR | 20160012952 | 2/2016 |
| KR | 20160012952 A | 2/2016 |
| WO | WO-2009022976 A1 | 2/2009 |
| WO | WO 2008/061810 | 8/2009 |
| WO | WO-2009121833 A1 | 10/2009 |
| WO | WO-2010024743 A1 | 3/2010 |
| WO | WO-2010133256 A1 | 11/2010 |
| WO | WO-2011028158 A1 | 3/2011 |
| WO | WO-2011056023 A2 | 5/2011 |
| WO | WO-2011095687 A1 | 8/2011 |
| WO | WO-2012138125 A2 | 10/2012 |
| WO | WO-2012148442 A1 | 11/2012 |
| WO | WO-2013071813 A1 | 5/2013 |
| WO | WO-2013120274 A1 | 8/2013 |
| WO | WO-2013142361 A1 | 9/2013 |
| WO | WO-2013167335 A1 | 11/2013 |
| WO | WO-2014014776 A1 | 1/2014 |
| WO | WO-2014021761 A2 | 2/2014 |
| WO | WO-2014104776 A1 | 7/2014 |
| WO | WO-2014161896 A1 | 10/2014 |
| WO | WO-2015006047 A1 | 1/2015 |
| WO | WO-2015019317 A1 | 2/2015 |
| WO | WO-2015034775 A1 | 3/2015 |
| WO | WO-2015062060 A1 | 5/2015 |
| WO | WO-2015134985 A1 | 9/2015 |
| WO | WO-2015177601 A1 | 11/2015 |
| WO | WO-2015180126 A1 | 12/2015 |
| WO | WO-2016079016 A1 | 5/2016 |
| WO | WO-2016146328 A1 | 9/2016 |
| WO | WO-2016151653 A1 | 9/2016 |
| WO | WO-2016185946 A1 | 11/2016 |
| WO | WO-2017148752 A1 | 9/2017 |
| WO | WO 2017198293 | 11/2017 |
| WO | WO-2018059858 A1 | 4/2018 |
| WO | WO-2018059859 A1 | 4/2018 |
| WO | WO-2018059860 A1 | 4/2018 |
| WO | WO-2018134629 A1 | 7/2018 |
| WO | WO-2018145796 A1 | 8/2018 |
| WO | WO-2018145797 A1 | 8/2018 |
| WO | WO-2018172002 A1 | 9/2018 |
| WO | WO-2018172003 A1 | 9/2018 |
| WO | WO-2019015900 A1 | 1/2019 |
| WO | WO 2019/040077 | 2/2019 |

OTHER PUBLICATIONS

European Search Report, Application No. 20155637.0, dated Apr. 28, 2020, 10 pages.
International Commission on Non-Ionizing Radiation Protection Icnirp: Guidelines for Limiting Exposure to Time-Varying Electric, Magnetic and Electromagnetic Fields (Up to 300 GHZ), ICNIRP Guidelines, Guidelines for Limiting Exposure to Time-Varying Electric, Magnetic, and Electromagnetic Field (Up to 300 GHZ), Jan. 1, 1999.
Ye, Dong Hye et al., IS&T International Symposium on Electronic Imaging, *Deep Learning for Moving Object Detection and Tracking from a Single Camera in Unmanned Aerial Vehicles (UAVs)*, © 2018, 6 pages.
Chen, Weifeng, *Single-Image Depth Perception in the Wild*, University of Michigan, 30<sup>th</sup> Conference on Neural information Processing Systems, 2016, 14 pages.
Chiarabiglio, Luca et al., *Planning 5G Networks Under EMF Constraints, State of the Art and Vision*, IEEE Access, Aug. 8, 2018, 17 pages.
European Search Report, Application No. 19188773.6, dated Jan. 7, 2020, 11 pages.
European Search Report, Application No. 20155636.2, dated Apr. 22, 2020, 10 pages.
Droogenbroeck, Marc Van, *Vibe: A Universal Background Subtraction Algorithm for Video Sequences*, IEEE, Research Gate, Jul. 2011, 18 pages.

Koda et al., *Reinforcement Learning Based Predictive Handover for Pedestrian-Aware mmWave Networks*, Apr. 2018, IEEE, Research Gate, 7 pages.
Great Britain Search Report, Application No. GB1910781.2, dated Jan. 13, 2020, 4 pages.
Nokia, Alcatel-Lucent Shanghai Bell, *Implications of High Frequency Bands on Mobility*,3GPP TSG-RAN WG2 NR Adhoc, Jan. 17, 2017, 4 pages.
Oguma et al., *Performance Modeling of Camera Assisted Proactive Base Station Selection for Human Blockage Problem in mmWave Communications*, IEEE, © 2016, 8 pages.
3GPP 36.420 v8.0.0 (Dec. 2007), "X2 General Aspects and Principals," Technical Specification, 3rd Generation Partnership Project, http://www.qtc.jp/3GPP/Specs/36420-800.pdf, (Release 8), Dec. 2007, 11 pages.
3GPP, "Issues on X2-GW deployment," 3rd Generation Partnership Project (3GPP), 3GPP TSG-RAN3 Meeting #79bis, R3-130571, Apr. 2013, 6 pages.
3GPP TR 24.826 V11.0.0 (Jun. 2011), "3rd Generation Partnership Project, Technical Specification Group Core Network and Terminals; Study on impacts on signalling between User Equipment (UE) and core network from energy saving, (Release 11)," 650 Route des Luciales-Sophia Antipolis Valbonne-France, 33 pages.
3GPP TR 36.927 V15.0.0 (Jul. 2018), "3rd Generation Partnership Project, Technical Specification Group Radio Access Network; Evolved Universal Terrestrial Radio Access (E-UTRA), Potential solution for energy saving for E-UTRAN (Release 15)," 650 Route des Luciales-Sophia Antipolis Valbonne-France, 22 pages.
3GPP TS 32.551 V15.0.0 (Jun. 2018), "3rd Generation Partnership Project, Technical Specification Group Services and System Aspects, Concepts and requirements; Telecommunication management, Energy Saving Management (ESM)," (Release 15), 650 Route des Luciales-Sophia Antipolis Val bonne-France, 26 pages.
3GPP TS 36.300 V11 6.0 (Jun. 2013), "3rd Generation Partnership Project; Technical Specification Group Radio Access Network; Overall description, Evolved Universal Terrestrial Radio Access (E-UTRA) and Evolved Universal Terrestrial Radio Access Network (EUTRAN), Stage 2 " (Release II), 650 Route des Luciales-Sophia Antipolis Valbonne-France, 209 pages.
3GPP TS 36.300 V13.3.0 (Mar. 2016), "3rd Generation Partnership Project, Technical Specification Group Radio Access Network, Overall description, Stage 2 Evolved Universal Terrestrial Radio Access (E-UTRA) and Evolved Universal Terrestrial Radio Access Network (E-UTRAN)," (Release 13), 650 Route des Luciales-Sophia Antipolis Valbonne-France, 295 pages.
3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, Release 14, 3GPP TS 36.300 V14.2.0, Mar. 2017, 330 pages.
3rd Generation Partnership Project, Technical Specification Group Radio Access Network, Evolved Universal Terrestrial Radio Access (E-UTRA), Radio Frequency (RF) system scenarios (Release 9) 3GPP TR 36.942 V9.3.0, Jun. 2012, 83 pages.
3rd Generation Partnership Project, Technical Specification Group Radio Access Network, Evolved Universal Terrestrial Radio Access Network (E-UTRAN), X2 application protocol (X2AP), Release 14, 3GPP TS 36.423 V14.2.0, Mar. 2017, 242 pages.
3rd Generation Partnership Project, Technical Specification Group Services and System Aspects, Telecommunication Management, "Study On Management Of Evolved Universal Terrestrial Radio Access Network (E-UTRAN) And Evolved Packet Core (EPC)," Release 8 3GPP TR 32.816 V8.0.0, Technical Report, Valbonne-France, Dec. 2008, 38 pages.
Application and Filing Receipt for U.S. Appl. No. 15/516,765, filed Apr. 4, 2017, Inventor(s): Fitch et al.
Application and Filing Receipt for U.S. Appl. No. 15/553,708, filed Aug. 25, 2017, Inventor(s): Fitch et al.
Application and Filing Receipt for U.S. Appl. No. 15/762,022, filed Mar. 21, 2018, Inventor(s): MacKenzie et al.
Application and Filing Receipt for U.S. Appl. No. 16/023,917, filed Jun. 29, 2018, Inventor(s): MacKenzie et al.

(56) References Cited

OTHER PUBLICATIONS

Carlson et al., "Scheduling to Minimize Interaction Cost," The Johns Hopkins University, Baltimore, Maryland, Jun. 2, 1965, 8 pages.
Chandra K., et al., "CogCell: Cognitive Interplay between 60 GHz Picocells and 2.4/5 GHz Hotspots in the 5G Era," IEEE Communications Magazine, May 7, 2015, 14 pages.
Christodoulou C. G., et al., "Reconfigurable Antennas for Wireless and Space Applications," Proceedings of the IEEE, Jul. 2012, vol. 100, No. 7, pp. 2250-2261.
Codan Radio, "RF Link Controlled Base Station," Codan Radio Communications, retrieved from https://www.codanradio.com/product/rf-link-controlled-base/, Accessed on Aug. 8, 2017, 2 pages.
Combined search and Examination Report for Great Britain Application No. 2001528.5, dated Jun. 24, 2020, 7 pages.
Combined search and Examination Report for Great Britain Application No. 2001529.3, dated Jun. 24, 2020, 7 pages.
Combined search and Examination Report for Great Britain Application No. 2008677.3, dated Nov. 18, 2020, 5 pages.
Combined Search and Examination Report under Section 17 and 18(3) for Application No. 1702030.6, dated Jul. 7, 2017, 2 pages.
Combined Search and Examination Report under Section 17 and 18(3) for Application No. GB1616539.1, dated Mar. 2, 2017, 6 pages.
Combined Search and Examination Report under Section 17 and 18(3) for GB Application No. 1616530.0, dated Feb. 23, 2017, 6 pages.
Combined Search and Examination Report under Section 17 and 18(3) for GB Application No. 1713816.5, dated Sep. 20, 2017, 5 pages.
Combined Search and Examination Report under sections 17 & 18(3) for Great Britain Application No. 1616534.2, dated Mar. 1, 2017, 8 pages.
Combined Search and Examination Report under sections 17 & 18(3) for Great Britain Application No. 1713815.7, dated Sep. 21, 2017, 5 pages.
Combined Search and Examination Report under Sections 17 & 18(3) for Great Britain Application No. 1704702.8, dated Aug. 14, 2017, 2 pages.
Communication pursuant to Article 94(3) EPC for European Application No. 17761237.1, dated Dec. 8, 2020, 8 pages.
Communication pursuant to Article 94(3) EPC for European Application No. 17764775.7, dated Sep. 3, 2020, 5 pages.
Corrected Search Report under Section 17 for Great Britain Application No. GB1702033.0, dated Jun. 29, 2017, 2 pages.
ETSI TR 136 927 V13.0.0 (Jan. 2016), "Evolved Universal Terrestrial Radio Access (E-UTRA); Potential Solutions for Energy Saving for E-UTRAN," Technical Report LTE, 3GPP TR 36.927 version 13.0.0 Release 13, 650 Route des Luciales-Sophia Antipolis Valbonne-France, 26 pages.
ETSI TS 132 551 V13.0.0 (Feb. 2016), "Universal Mobile Telecommunications System (UMTS); LTE, Telecommunication management Energy Saving Management (ESM); Concepts and requirement," Technical Specification, Release 13, 650 Route des Luciales-Sophia Antipolis Valbonne-France, 28 pages.
European Search Report for EP Application No. 16158665.6 dated Sep. 13, 2016, 6 pages.
European Search Report for EP Application No. 16160809.6 dated Sep. 26, 2016, 14 pages.
European Search Report for EP Application No. 16191517.8, dated Mar. 27, 2017, 8 pages.
European Search Report for EP Application No. 16191519.4, dated Mar. 31, 2017, 8 pages.
European Search Report for EP Application No. 16191524.4, dated Apr. 7, 2017, 10 pages.
European Search Report for EP Application No. 17180358.8, dated Jan. 31, 2018, 5 pages.
Examination Report under section 18(3) for Application No. 1702030.6, dated May 3, 2019, 2 pages.
Examination Report under section 18(3) for GB Application No. 1713816.5, dated Oct. 10, 2017, 3 pages.
Examination Report under section 18(3) for GB Application No. 1713816.5, dated Nov. 15, 2018, 3 pages.
Examination Report under Section 18(3) for Great Britain Application No. 1704702.8, dated Oct. 22, 2019, 4 pages.
Examination Report under section 18(3) for Great Britain Application No. 1713815.7, dated Nov. 15, 2018, 3 pages.
Examination Report Under Section 18(3) for Great Britain Application No. GB1704702.8, dated Jun. 17, 2019, 2 pages.
Extended European Search Report for Application No. 19194981.7, dated Nov. 27, 2019, 8 pages.
Extended European Search Report for Application No. 15187067.2, dated Mar. 18, 2016, 8 pages.
Extended European Search Report for Application No. 17155116.1, dated Jul. 6, 2017, 8 pages.
Extended European Search Report for Application No. 17155118.7, dated Aug. 29, 2017, 7 pages.
Extended European Search Report for Application No. 17162851.4, dated Sep. 5, 2017, 13 pages.
Extended European Search Report for Application No. 17162854.8, dated Aug. 31, 2017, 18 pages.
Extended European Search Report for Application No. 17181876.8, dated Jan. 8, 2018, 11 pages.
Extended European Search Report for Application No. EP14194204.5, dated Jul. 23, 2015, 7 pages.
Extended European Search Report for Application No. EP15275077.4, dated Sep. 4, 2015, 8 pages.
Extended European Search Report for Application No. EP20179462.5, dated Jun. 24, 2020, 6 pages.
Fairbrother et al., "A Two-Level Graph Partitioning Problem Arising in Mobile Wireless Communications"; arXiv: 1705.08773v1 [math.OC] May 24, 2017; 23 pages.
GB Search Report for Application No. 1517069.9, dated Mar. 7, 2016, 4 pages.
GB Combined Search and Examination Report for Application No. 1517069.9, dated Jan. 31, 2018, 3 pages.
GB Combined Search and Examination Report for Application No. 1711529.6, dated Dec. 13, 2017, 7 pages.
GB Combined Search and Examination Report for GB Application No. GB1603748.3, dated Aug. 26, 2016, 6 pages.
GB Search and Examination Report for GB Application No. GB 1710989.3, dated Dec. 1, 2017, 5 pages.
Ghaddar et al., "A Branch-And-Cut Algorithm Based On Semidefinite Programming For The Minimum K-Partition Problem," Ann Oper Res DOI 10 1007/s10479-008-0481-4, Springer Science+Business Media, LLC 2008, Published online Dec. 3, 2008, 20 pages.
Great Britain Combined Search and Examination Report under Sections 17 & 18 (3) for Application No. GB1702033.0, dated Nov. 29, 2017, 1 page.
Great Britain Combined Search and Examination Report Under Sections 17 & 18(3) for Application No. GB1704694.7, dated Aug. 14, 2017, 2 pages.
Great Britain Examination Report under Section 18(3) for Application No. GB1704694.7, dated Jun. 5, 2019, 1 page.
Great Britain Examination Report under Section 18(3) for Application No. GB1704702.8, dated Oct. 22, 2019, 4 pages.
Great Britain Search Report Under Section 17 for Application No. GB1704694.7, dated Aug. 11, 2017, 2 pages.
Huawei, "Report of Email Discussion [97bis#19][LTE/FeD2D]-Grouphandover," 3GPP Draft, R2-1705300, 3rd Generation Partnership Project (3GPP), 3GPP TSG RAN WG2#98, Hangzhou, China, May 15-19, 2017, 18 pages.
Intention to Grant for GB Application No. 1713815.7, dated Jan. 14, 2019, 2 pages.
Intention to Grant for GB Application No. 1713816.5, dated Jan. 14, 2019, 2 pages.
International Preliminary Report on Patentability for Application No. PCT/EP2015/076524, dated Mar. 7, 2017, 12 pages.
International Preliminary Report on Patentability for Application No. PCT/EP2016/053286, dated Feb. 6, 2017, 14 pages.
International Preliminary Report on Patentability for Application No. PCT/EP2016/069745, dated Oct. 20, 2017, 13 pages.

(56) References Cited

OTHER PUBLICATIONS

International Preliminary Report on Patentability for Application No. PCT/EP2017/052738, dated Jun. 22, 2018, 27 pages.
International Preliminary Report on Patentability for Application No. PCT/EP2017/071645, dated Apr. 11, 2019, 14 pages.
International Preliminary Report on Patentability for Application No. PCT/EP2017/071646, dated Apr. 11, 2019, 8 pages.
International Preliminary Report on Patentability for Application No. PCT/EP2017/071649, dated Apr. 11, 2019, 8 pages.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Preliminary Report on Patentability for Application No. PCT/EP2018/054135, dated Oct. 3, 2019, 11 pages.
International Preliminary Report on Patentability for PCT Application No. PCT/EP2017/053957, dated Sep. 4, 2018, 6 pages.
International Search Report and Written Opinion for Application No. PCT/EP2015/076524, dated Dec. 21, 2015, 11 pages.
International Search Report and Written Opinion for Application No. PCT/EP2016/053286, dated Apr. 11, 2016, 11 pages.
International Search Report and Written Opinion for Application No. PCT/EP2016/069745, dated Nov. 11, 2016,11 pages.
International Search Report and Written Opinion for Application No. PCT/EP2017/071645, dated Nov. 27, 2017, 21 pages.
International Search Report and Written Opinion for Application No. PCT/EP2017/071646, dated Oct. 18, 2017, 12 pages.
International Search Report and Written Opinion for Application No. PCT/EP2017/071649, dated Oct. 12, 2017, 9 pages.
International Search Report and Written Opinion for Application No. PCT/EP2017/082585, dated Apr. 9, 2018, 11 pages.
International Search Report and Written Opinion for Application No. PCT/EP2017/082586, dated Feb. 9, 2018, 9 pages.
International Search Report and Written Opinion for Application No. PCT/EP2018/054134, dated Apr. 5, 2018, 23 pages.
International Search Report and Written Opinion for Application No. PCT/EP2018/054135, dated Apr. 26, 2018, 12 pages.
International Search Report and Written Opinion for Application No. PCT/EP2018/066116, dated Aug. 29, 2018, 11 pages.
International Search Report and Written Opinion for Application No. PCT/EP2020/065932, dated Jul. 14, 2020, 16 pages.
International Search Report and Written Opinion for PCT Application No. PCT/EP2017/052738, dated Mar. 27, 2017, 20 pages.
International Search Report and Written Opinion for PCT Application No. PCT/EP2017/053957, dated May 23, 2017, 11 pages.
Invitation to pay additional fees and, where applicable, protest fee for PCT Application No. PCT/EP2017/071645, mailed Oct. 9, 2017, 17 pages.
Legg, P., et al., "Load Balancing and Aggregation Algorithms for LTE Dual Connectivity," 2016 IEEE 83rd Vehicular Technology Conference (VTC Spring), May 15, 2016, 5 pages.
Macqueen J., "Some Methods For Classification And Analysis Of Multivariate Observations," Fifth Berkeley Symposium, University of California, Los Angeles, 1967, pp. 281-297.
Motorola, et al., "Draft CR capturing HeNB inbound mobility agreements," 3GPP Draft, R2-096401 CR HENB 36_300 Agreements_ V7, 3rd Generation Partnership Project (3GPP), Jeju, Korea, XP050391033, Nov. 9, 2009, 4 pages.
Mukhopadhyay et al., "Novel RSSI Evaluation Models For Accurate Indoor Localization With Sensor Networks," 978-1-4799-2361-8/14, Bharti School of Telecommunication Technology and Management IIT Delhi Hauz Khas, New Delhi, 2014 IEEE, 6 pages.
New Postcom, "X2 Connection and Routing for X2-GW Deployment," 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
NGNM the engine of broadband wireless innovation "Recommended Practices for multi-vendor SON deployment," Deliverable D2 Version 1.0 by NGNM Alliance, Reading Bridge House George Street Reading Berkshire RG 1 8LS UK, Jan. 28, 2014, 30 pages.
Ning L., et al., "Fuzzy Layered Physical Cell Identities Assignment in Heterogeneous and Small Cell Networks," Electronics Letters May 12, 2016, vol. 52 No. 10, pp. 879-881.
Nokia Siemens Networks., "X2 Interface Proxy at DeNB," R3-101662, 3rd Generation Partnership Project(3GPP), 3GPP TSG-RAN WG Meeting #70, Montreal, Canada, May 10-14, 2010, 5 pages.
Qualcomm Technologies, Inc. "LTE Small Cell SON Test Cases, Functionality and Interworking", San Diego, CA, USA, Jun. 5, 2015, 82 pages.
Qualcomm Europe, "QoS principles for CSG members and non-members at hybrid access mode HeNBs," 3GPP Draft, R3-091022, 3rd Generation Partnership Project (3GPP), San Francisco, US, XP050341407, May 4-8, 2009, 4 pages.
Qualcomm Europe, "QoS support for hybrid CSG cells," 3GPP Draft, R3-091454, 3rd Generation Partnership Project (3GPP), San Francisco, US, XP050341776, May 4, 2009, 3 pages.
Rendl F., "Semidefinite Relaxations For Partitioning, Assignment And Ordering Problems," Cross Mark, Ann Oper Res (2016) 240 119-140 DOI 10 1007/s10479-015-2015-1, Published online Sep. 15, 2015, Springer Science+Business Media New York 2015, 22 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Search Report Under Section 17 for Great Britain Application No. GB1704702.8, dated Aug. 10, 2017, 2 pages.
Small Cell Forum Release 9.0, Document 176.09.01 LTE small cell SON test cases, Functionality and interworking, version 176.09.01, Feb. 21, 2017, 95 pages.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
UK Combined Search and Examination Report for GB Patent Application No. GB1604515.5, dated Sep. 9, 2016, 3 pages.
UK Examination Report for GB Patent Application No. GB1604515. 5, dated May 11, 2017, 1 page.
UK Examination Report for GB Patent Application No. GB1604515. 5, dated Jan. 31, 2018, 3 pages.
UK Intention to Grant for GB Patent Application No. GB1604515.5, dated May 11, 2018, 2 pages.
Viprinet: Bonding LTE / 4G via LTE routers—better than Load Balancing | LTE /4G, "LTE—We Combine the Latest Mobile Phone Generation!," Jul. 1, 2019, retrived from https://www.viprinet.com/en/technology/combinable-media/lte-4g, 4 pages.
Web article, "DSDP," NEOS Interfaces to DSDP, http://www.mcs.anl.gov/DSDP, retrieved Jul. 3, 2017, 4 pages.
Web article, "Welcome to CVXPY," Welcome to CVXPY—CVXPY 0.4.9 documentation, http://www.cvxpy.org/en/latest, retrieved Jul. 3, 2017, 1 page.
Wu et al., "Physical Cell Identity Self-Organization for Home eNodeB Deployment in LTE"; Nokia Siemens Networks, 978-1-4244-3709-2/10, Beijing China, 2010 IEEE, 6 pages.
Yang Z., et al., "Sensor-assisted Codebook-based Beamforming for Mobility Management in 60 GHz WLANs," IEEE 12th International Conference on Mobile Ad Hoc and Sensor Systems, 2015, pp. 333-341.
Younis., et al., "Military Communications; Cognitive MANET Design For Mission-Critical Networks," IEEE Communications Magazine, 0163-6804/09 2009 IEEE, Oct. 2009, 5 pages.
Bibliographic data: XP051295206; 3GPP TS 23.122, Generation Partnership Project; Technical Specification Group Core Network and Terminals; Non-Access-Stratum (NAS) functions related to Mobile Station (MS) in idle mode, 3rd Generation Partnership Project (3GPP), Mobile Competence Centre; 650, Route Des Lucioles; F-06921 Sophia-Antipolis Cedex; France, vol. CT WG1, No. V12. 9.0, Jun. 24, 2016, (Release 12), 1 page.
Bibliographic data: XP050909974; 3rd Generation Partnership Project; Technical Specification Group Radio Access Network; Evolved Universal terrestrial Radio Access (E-UTRA) and Evolved Univer-

(56) References Cited

OTHER PUBLICATIONS sal Terrestrial Radio Access Network (E-UTRAN); Radio interface protocol aspects (Release 7), Oct. 17, 2006, 1 page.

\* cited by examiner

CELLULAR TELECOMMUNICATIONS NETWORK

RELATED APPLICATION

The present application claims priority to EP Application No. 19188772.8 filed Jul. 29, 2019, and GB Application No.: 1910781.2, filed Jul. 29, 2019, which are hereby incorporated herein in their entireties by reference.

TECHNICAL FIELD

The present disclosure relates to a method in a cellular telecommunications network.

BACKGROUND

Cellular telecommunications networks include a plurality of base stations, each having a coverage area within which the base station provides voice and data services to a plurality of User Equipments (UEs). UEs are often mobile and therefore can move from the coverage area of a current ("serving") base station to the coverage area of another base station. When this occurs, the UE must be transferred to the other base station (in which the other base station is known as the "target" of that transfer) so that the target base station thereafter provides voice and data services to the UE.

Base stations of conventional cellular telecommunications networks operated with transmission powers and frequency bands that permitted coverage areas of several square kilometers. However, base stations of modern cellular telecommunications networks can also utilize frequency bands with relatively high frequencies that correspond to relatively small coverage areas. This includes, for example, millimeter wave (mmWave) frequency bands of 30-300 GHz. Furthermore, such high frequencies have relatively high attenuation through building materials, so that outdoor base stations of modern cellular telecommunications networks provide relatively poor indoor service. To ensure a good quality connection with a base station operating in these frequency bands, a UE should have Line of Sight (LoS) with the base station. Furthermore, to maintain connectivity in these modern networks where UEs require LoS to the base station, the UE must be transferred between base stations (or between distinct beams of a single base station) more frequently. This results in a corresponding increase in control signaling for the UE to perform radio measurement reporting.

SUMMARY

According to a first aspect of the disclosure, there is provided a method of switching a base station in a cellular telecommunications network between a first and second mode, in which the base station uses more energy when operating in the first mode than the second mode, wherein the cellular telecommunications network further includes a User Equipment, UE, having a camera, the method comprising: storing visual data including a visual representation of at least a part of the base station; receiving visual data captured by the camera of the UE; performing a computer vision operation, trained on the stored visual data, on the captured visual data to determine whether the visual representation of the base station or part thereof is present in the captured visual data; and, in response initiating a switch in the base station between the first and second modes.

The determination may be that the visual representation of the base station is present in the captured visual data, and the switch may be from the second mode to the first mode. The determination may be that the visual representation of the base station is not present in the captured visual data, and the switch may be from the first mode to the second mode.

The visual representation of at least part of the base station may further include one or more features in the base station's surroundings.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a network node in a cellular telecommunications network, the network node having a transceiver, a processor and a memory configured to cooperate to carry out the method of the first aspect of the disclosure. The network node may be a UE or a base station.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
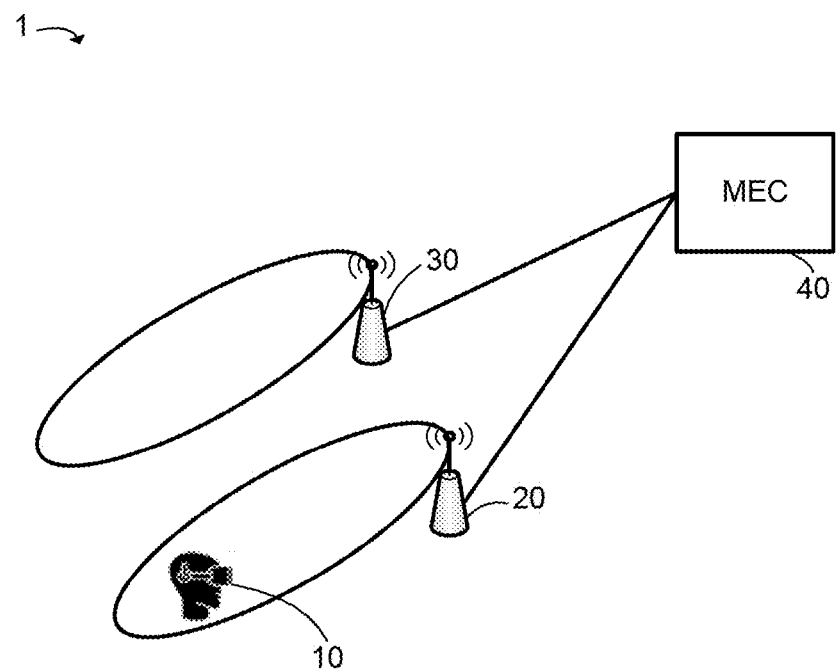
FIG. 1 is a schematic diagram of an embodiment of a cellular telecommunications network of the present disclosure.

A first embodiment of a cellular telecommunications network 1 will now be described with reference to FIGS. 1 to 4. The cellular telecommunications network 1 includes a User Equipment (UE) 10, a first base station 20, a second base station 30 and a Mobile Edge Computing (MEC) server 40. FIG. 1 illustrates a first beam of the first base station 20 being transmitted about a coverage area. Although the first base station 20 is likely to transmit a plurality of beams, only this first beam is shown for simplicity. The UE 10 is shown as being positioned within the first beam of the first base station 20. FIG. 1 also illustrates a first beam of the second base station being transmitted about a coverage area. Again, the second base station 30 is likely to transmit a plurality of beams, but only this first beam is shown for simplicity.

Figure 2:
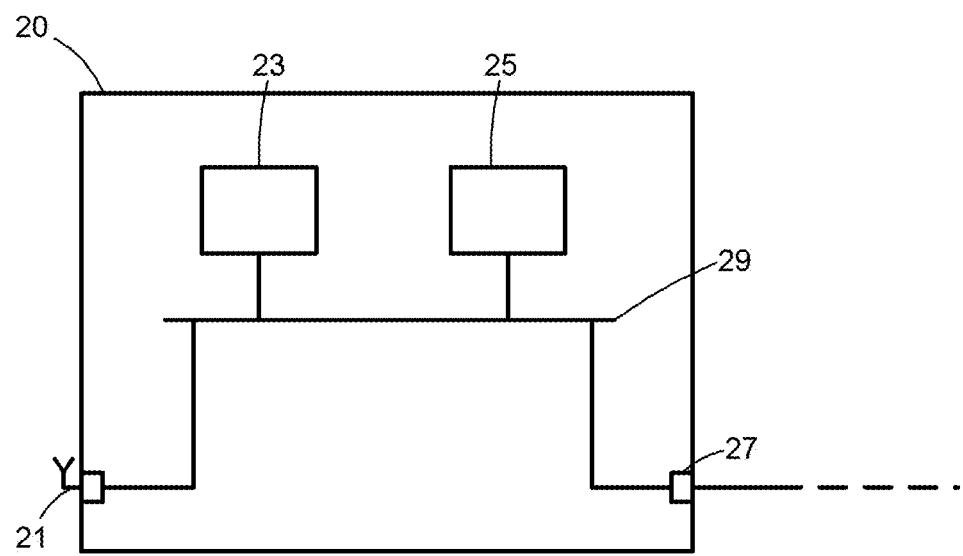
FIG. 2 is a schematic diagram of a first base station of the network of FIG. 1.

The first base station 20 is shown in more detail in FIG. 2. The first base station 20 includes a first communications interface 21, a processor 23, memory 25 and a second interface 27, all connected via bus 29. In this embodiment, the first communications interface 21 is an antenna configured for wireless communications using signals having frequencies ranging from 30 GHz to 300 GHz (such signals are known as millimeter waves, mmWave), and the second communications interface 27 is a wired connection (e.g. optical fiber) to one or more cellular core networking nodes (including the MEC 40). The processor 23 and memory 25 are configured for facilitating these communications, such as by processing and storing data packets sent/received via the first and second communications interfaces.

In this embodiment, the second base station 30 is substantially the same as the first base station 20.

Figure 3:
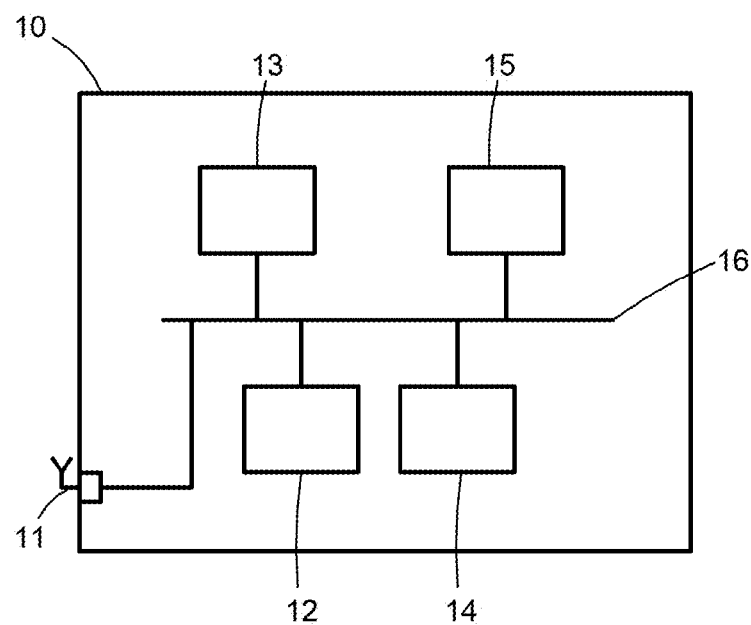
FIG. 3 is a schematic diagram of a UE of the network of FIG. 1.

The UE 10 is shown in more detail in FIG. 3. In this embodiment, the UE 10 is a virtual reality headset configured for cellular telecommunications. Accordingly, the UE 10 includes a communications interface 11, a processor 12, memory 13, an optical camera 14, and a display 15, all connected via bus 16. In this embodiment, the communications interface 11 is an antenna configured for wireless communications using signals having frequencies ranging from 30 GHz to 300 GHz. The optical camera 14 is configured for capturing images or video (i.e. a sequence of images) in the visible spectrum (that is, of electromagnetic radiation having wavelengths in the range of around 400 to 700 nanometers).

Figure 4:
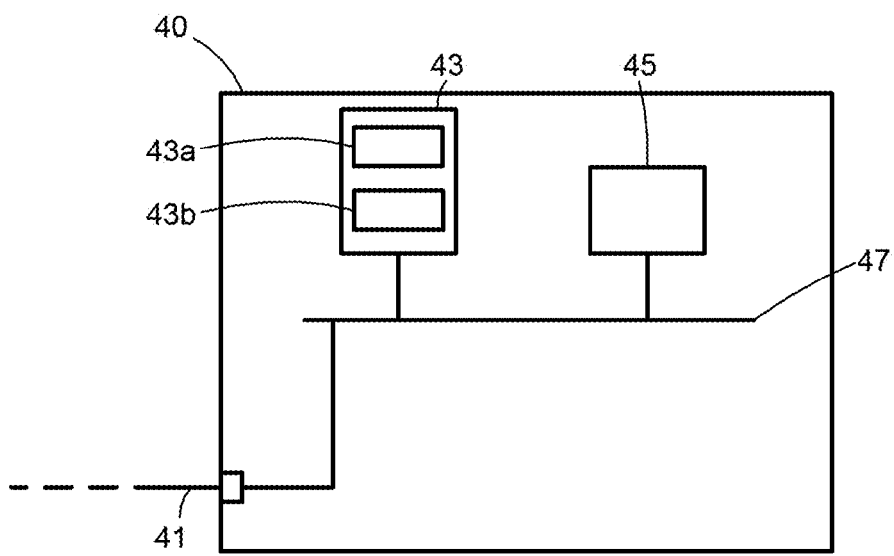
FIG. 4 is a schematic diagram of an edge computing node of the network of FIG. 1.

The MEC 40 is shown in more detail in FIG. 4. In this embodiment, the MEC 40 includes a communications interface 41, a processor 43, and memory 45, all connected via bus 47. Memory 45 includes a database of visual training data for a computer vision learning agent. In this embodiment, memory 45 includes a database having a first database table including:
1. a base station identifier uniquely identifying the base station from any other base station in the network (e.g. an enhanced Cell Global Identifier, eCGI, for the base station),
2. location data for the base station (e.g. the base station's Global Navigation Satellite System, GNSS, coordinates), and
3. a base station image identifier (uniquely identifying images of that base station in situ) used to look up corresponding images of that base station in a second database table.

The second database table therefore includes the base station image identifier and one or more images of that base station in its real-world position (e.g. at a variety of angles). This data is used to train a computer vision process implemented by processor 43.

Memory 45 is updated with new information for each base station, and information on each new base station in the cellular telecommunications network. For example, memory 45 may be updated with new images of the first and second base stations in their real-world positions on a periodic basis, and updated with information on a new base station being added to the network and one or more images of that base station in its real-world position.

The processor 43 of MEC 40 implements a computer vision process by a learning agent 43*a* and an inference agent 43*b*. The learning agent 43*a* is configured to train a machine learning algorithm, in this case a classification model, based on the visual training data in the database. The classification model maps between each input image from the second database table and the corresponding base station identifier. The trained classification model may then be used by the inference agent 43*b*.

The learning agent 43*a* performs periodic learning operations to update the classification algorithm, thus adapting to any new images of existing base stations or of images of new base stations.

The inference agent 43*b* uses the trained classification model in order to map between an input image (e.g. an image captured by the optical camera 14 of the UE 10) and a base station identifier. This will be explained in more detail, below.

Figure 5:
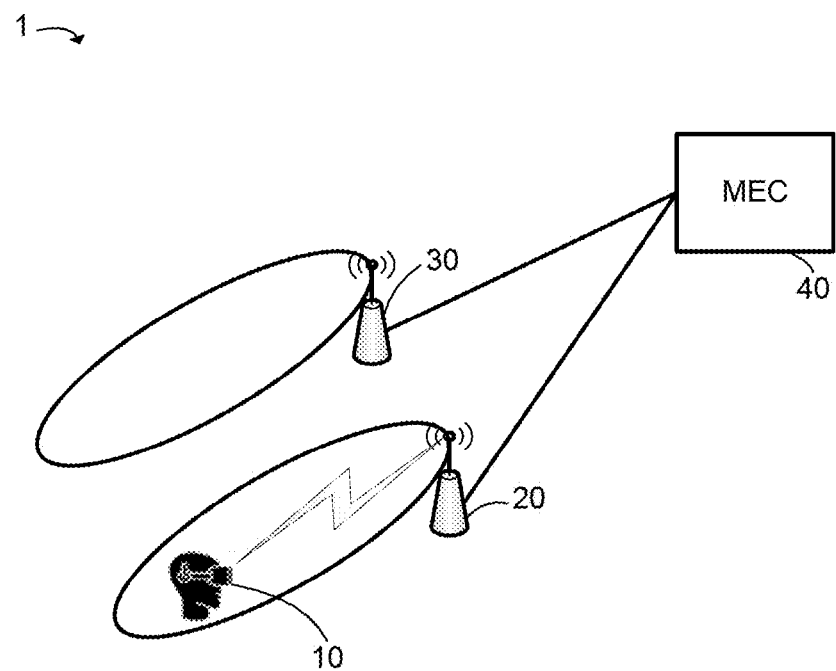
FIG. 5 is a schematic diagram of a cellular telecommunications network implementing a first embodiment of a method of the present disclosure, in a first state.
Figure 6:
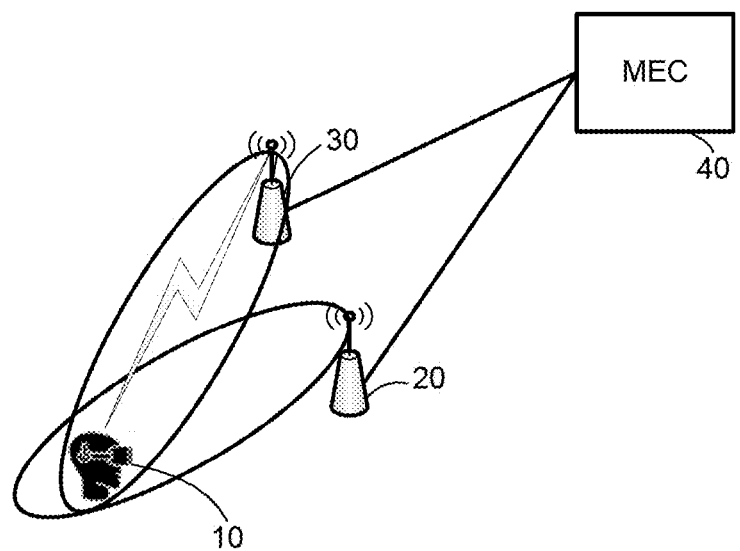
FIG. 6 is a schematic diagram of the cellular telecommunications network implementing the first embodiment of a method of the present disclosure, in a second state.
Figure 7:
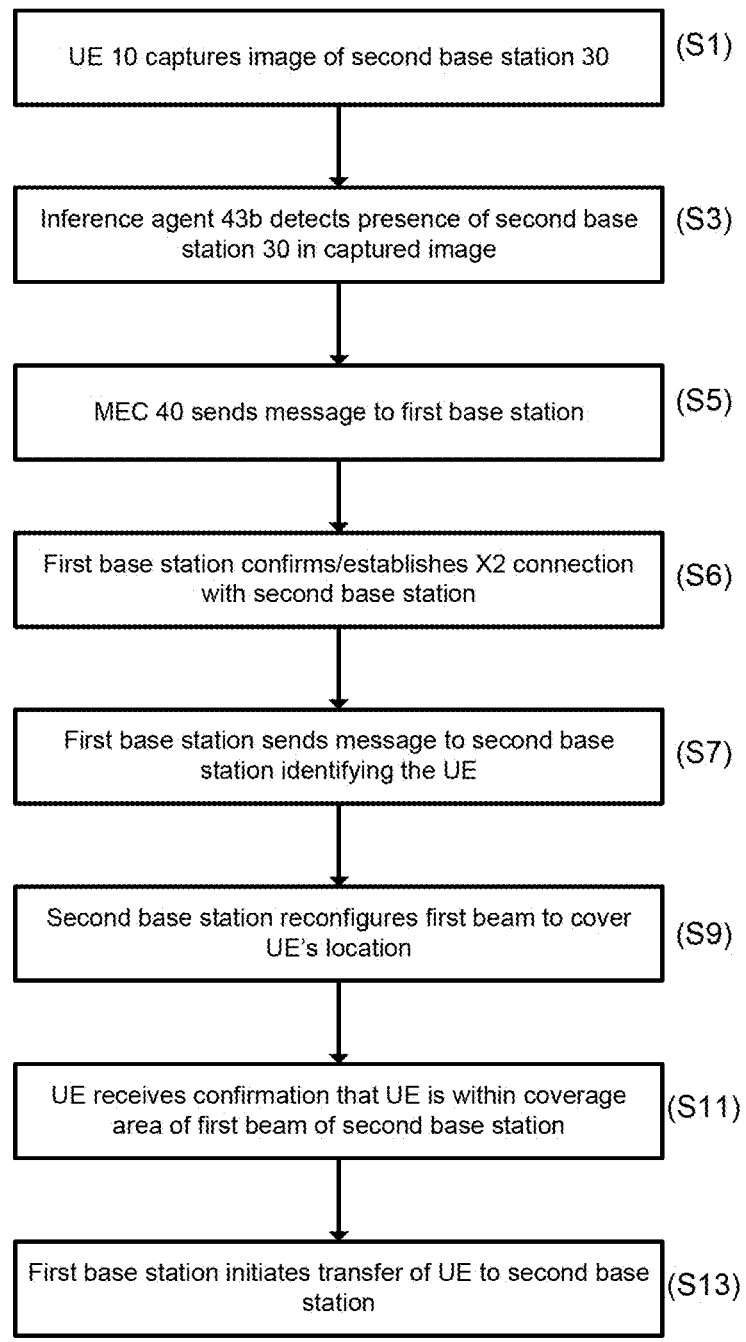
FIG. 7 is a flow diagram illustrating the first embodiment of the method of the present disclosure.

A first embodiment of a method of the present disclosure will now be described with reference to FIGS. 5 to 7. In this first embodiment, as shown in FIG. 5, the UE 10 is being served by the first base station 20 and is positioned within the coverage area of the first base station's first beam. In S1, the UE 10 captures an image via its optical camera 14. In this example, the captured image includes the second base station 30. The image is transmitted to the MEC 40, via the first base station 20.

In S3, the inference agent 43*b* takes the captured image as its input and, using its trained classification model, outputs a base station identifier. In this example, the inference agent 43*b* uses its trained classification model to output a base station image identifier (based on a mapping between the captured image and one or more images of the second base station 30 stored in the second database table). The processor 43 then uses the stored mapping (from the first database table) to map between the base station image identifier and the base station identifier (e.g. eCGI) for the second base station 30.

In S5, the MEC 40 sends a message to the first base station 20 including 1) the base station identifier (e.g. eCGI) of the second base station 30, and 2) an indicator that the UE 10 has LoS to the second base station 30.

In S6, the first base station 20 consults its Neighbor Relations Table (NRT) to determine whether or not the second base station 30 is a known neighbor. If not, then the first base station 20 establishes an X2 connection (that is, an inter-base station connection) with the second base station 30 and records information for the second base station 30 in its NRT.

In S7, the first base station 20 sends an X2 message to the second base station 30 identifying the UE 10 and the UE's GNSS coordinates. In S9, the second base station 30 reacts to this message by reconfiguring its first beam so that its coverage area covers the UE 10. That is, the second base station 30 may calculate a distance and an orientation angle to the UE 10 based on its own GNSS coordinates and the UE's GNSS coordinates. The second base station 30 may then reconfigure its first beam to transmit at the calculated orientation angle and over the calculated distance. In S11, the first base station 20 receives confirmation that the UE 10 is now within the coverage area of the first beam of the second base station 30. In this embodiment, this confirmation is via a confirmation message from the second base station 30. In S13, the first base station 20 initiates a transfer of the UE 10 to the second base station 30 so that the UE 10 is thereafter served by the second base station 30. Following this reconfiguration, the cellular telecommunications network 1 is as shown in FIG. 6.

In cellular telecommunications networks utilizing relatively high frequency bands (such as the mmWave frequency band used in this embodiment), UEs have a better quality connection when the UE and serving base station have LoS. Accordingly, this embodiment utilizes the optical camera of the UE 10 and a computer vision process to determine that the UE 10 has LoS with the base station and, in response, initiates a transfer of the UE to that base station. This embodiment therefore omits the typical UE measurement reporting parts of a traditional handover. Such steps are unnecessary following this positive determination that the UE 10 has LoS with the second base station 30. Furthermore, this embodiment supports a transfer of the UE 10 to another base station when such a transfer would not be possible with a traditional handover. That is, the second base station's first beam does not initially cover the UE 10 (as shown in FIG. 5), so the UE's measurement reports would not identify the second base station 30 (such that the first base station's NRT would not identify the second base station 30) and the transfer would not be possible. However, as illustrated above, by identifying that the UE 10 has LoS with the second base station 30 from the captured image, the second base station 30 may reconfigure in order to provide service in a coverage area that covers the UE 10 so that a transfer to the second base station 30 becomes possible.

In the above embodiment, the first base station 20 reacts to the message from the MEC server 40 by performing several steps resulting in a transfer of the UE 10 to the second base station 30. This may be due to, for example, the connection between the UE and first base station degrading (e.g. if measurement reports or the visual data indicate that the distance between the UE and first base station are increasing). However, the skilled person will understand that this reaction may also be used to balance network load.

Figure 8:
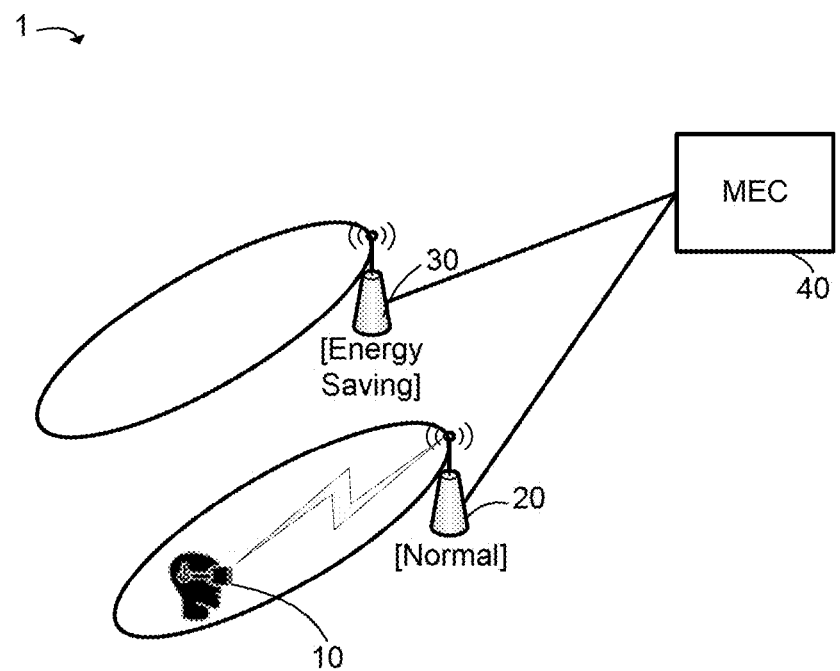
FIG. 8 is a schematic diagram of a cellular telecommunications network implementing a second embodiment of a method of the present disclosure, in a first state.
Figure 9:
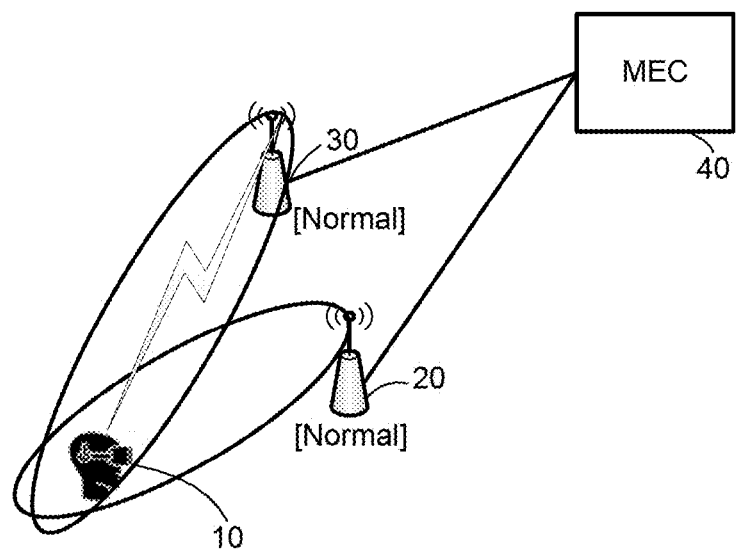
FIG. 9 is a schematic diagram of the cellular telecommunications network implementing the second embodiment of a method of the present disclosure, in a second state.
Figure 10:
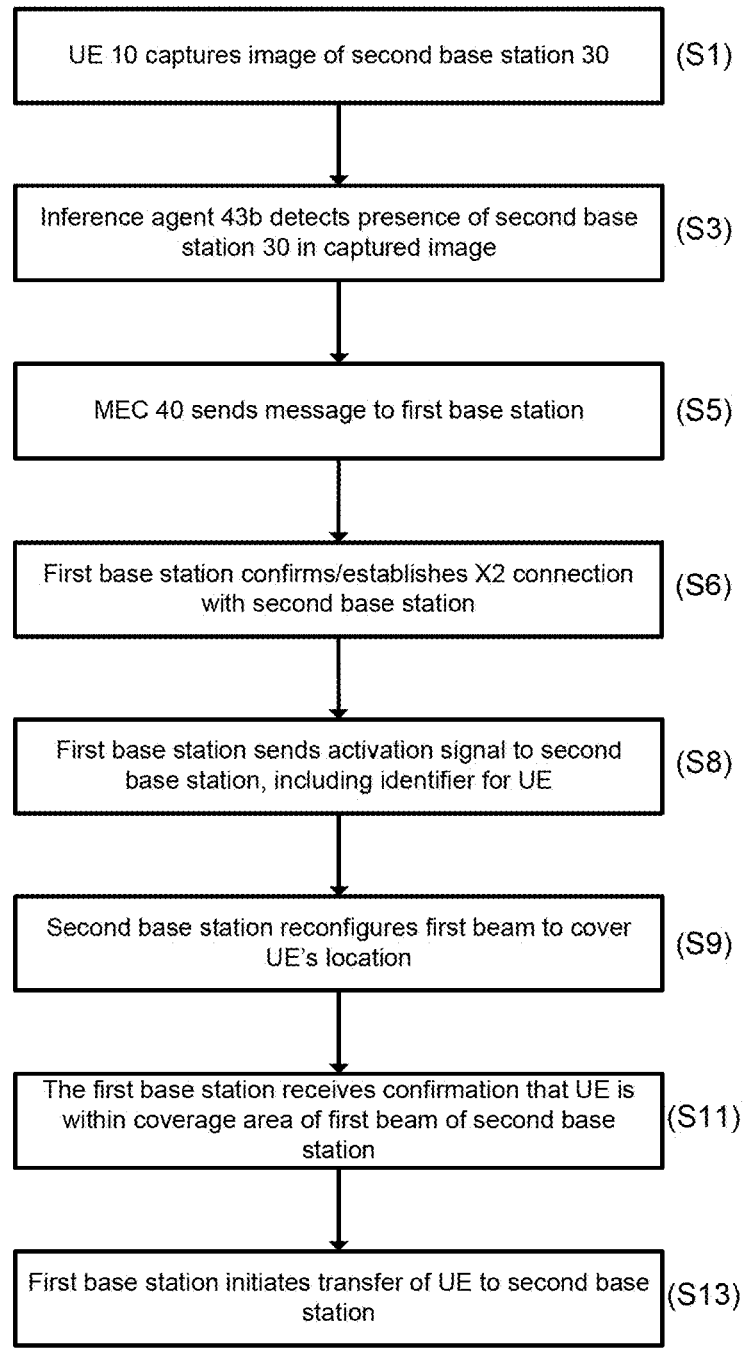
FIG. 10 is a flow diagram illustrating the second embodiment of the method of the present disclosure.

A second embodiment of a method of the present disclosure will now be described with reference to FIGS. 8 to 10. This second embodiment utilizes the same cellular telecommunications network of the first embodiment and therefore the same reference numerals will be used. Furthermore, S1 to S6 are also performed in this second embodiment, so that the MEC 40 sends a message to the first base station 20 including 1) the base station identifier (e.g. eCGI) of the second base station 30, and 2) and indicator that the UE 10 has LoS to the second base station 30, and, in response, the first base station 20 confirms/establishes an X2 connection with the second base station 30.

The first and second base stations 20, 30 may operate in either a first (active) state or a second (energy saving) state. The first and second base stations 20, 30 use more energy when in the active state than when in the energy saving state. Following S6, the first and second base stations 20, 30 communicate over their X2 connection to update their respective NRTs with information on the neighboring base station. This information includes the operating state of the base station. In this second embodiment, as shown in FIG. 8, the second base station 30 is initially in an energy saving state. In S8, the first base station 20 sends an activation signal (over the X2 connection) to the second base station 30. This activation signal causes the second base station 30 to switch from the energy saving state to the active (i.e. non-energy saving state) mode of operation. In this second embodiment, the activation signal further includes an identifier for the UE 10 and the UE's GNSS coordinates. Similar to the first embodiment, the second base station 30 responds to this information by reconfiguring its first beam so that its coverage area covers the UE 10. Following this reconfiguration, the second base station 30 sends a message to the first base station 20 confirming that the UE 10 is now within the coverage area of the first beam of the second base station 30, and, in response, the first base station 20 initiates a transfer of the UE 10 to the second base station 30 (that is, implementing S9, S11 and S13 of the first embodiment). Following these, the cellular telecommunications network is in the configuration shown in FIG. 9.

This second embodiment therefore provides a further benefit in detecting LoS between a UE and a base station based on an image captured from the UE's optical camera in that, in response, the base station may be switched from an energy saving mode of operation to a normal (active) mode of operation. The base station may then be used as a handover target. This is also possible when the second base station 30 is not already known to the first base station 20 (that is, the second base station 30 is not a member of the first base station's NRT), as the identification of the second base station 30 from the image captured by the UE 10 allows the first base station 20 to identify the second base station 30 as a neighbor even though the UE is not present in the second base station's first beam.

In an enhancement to this second embodiment, the MEC server 40 continues to process visual data received from the UE 10 and determines that the UE 10 subsequently loses LoS with the first base station 20. Following this determination, the MEC 40 sends an instruction message to the first base station 20 to switch from its normal (active) mode of operation to an energy saving mode of operation. This second embodiment therefore uses LoS information to switch base stations into and out of energy saving mode.

Figure 11:
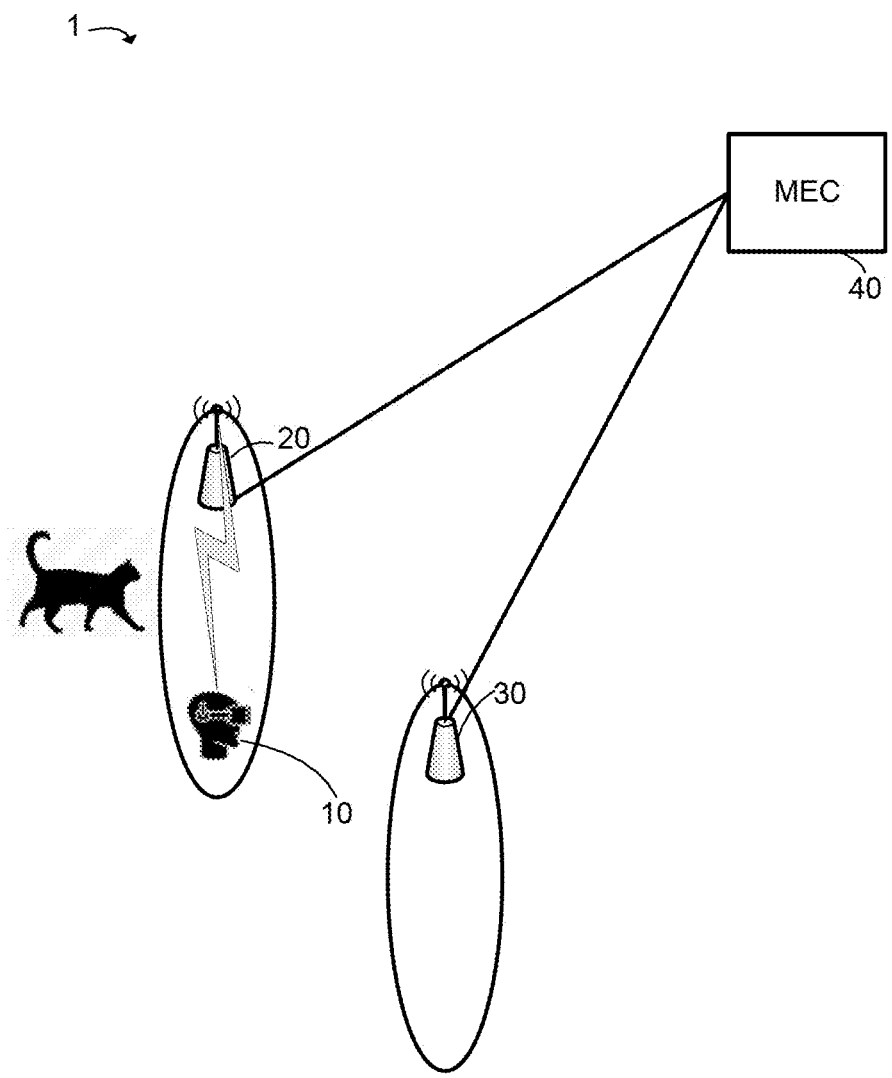
FIG. 11 is a schematic diagram of a cellular telecommunications network implementing a third embodiment of a method of the present disclosure, in a first state.
Figure 12:
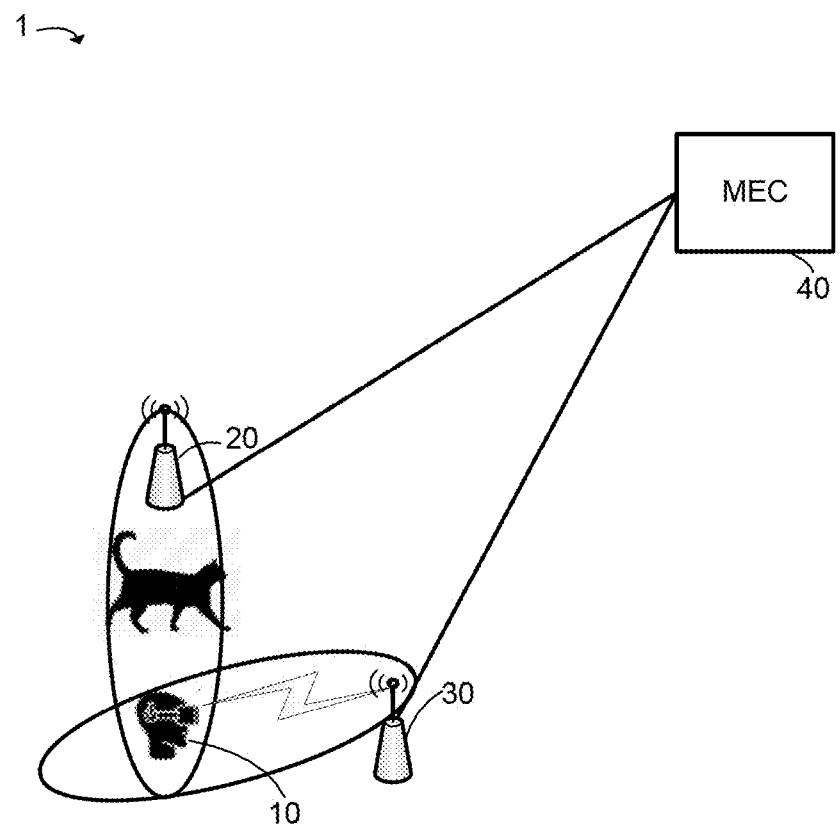
FIG. 12 is a schematic diagram of the cellular telecommunications network implementing the third embodiment of a method of the present disclosure, in a second state.
Figure 13:
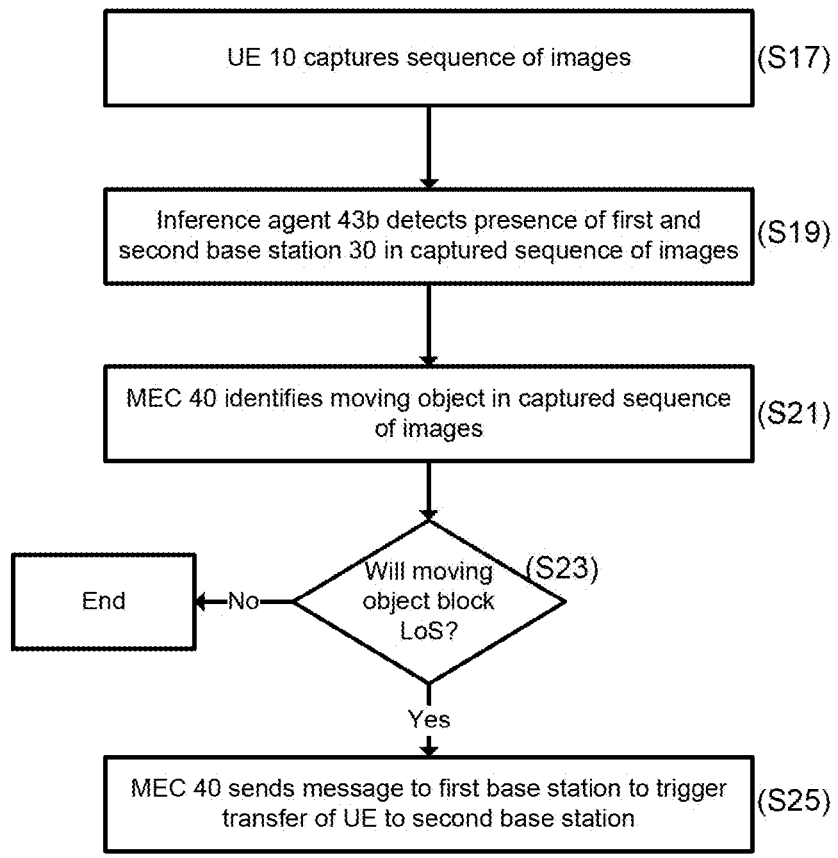
FIG. 13 is a flow diagram illustrating the third embodiment of the method of the present disclosure.

A third embodiment of a method of the present disclosure will now be described with reference to FIGS. 11 to 13. This third embodiment also utilizes the same cellular telecommunications network of the first embodiment and therefore the same reference numerals will be used. In S17 the UE 10 captures a sequence of images using its optical camera. This sequence of images is sent to the MEC server 40 via the first base station 20.

In S19, the MEC server 40 processes the sequence of images and determines that both the first and second base station 20, 30 are present (using the inference agent 43b and the trained classification model, as discussed in the first embodiment above).

In S21, the MEC server 40 is also able to identify a moving object in the sequence of images. This is achieved by background subtraction to determine that the object has a different position in different images of the sequence of images. In this example, the MEC server 40 implements the background subtraction method detailed in "ViBe: A Universal Background Subtraction Algorithm for Video Sequences," O. Barnich and M. Van Droogenbroeck, IEEE Transactions on Image Processing, vol. 20, no. 6, pp. 1709-1724, June 2011.

In S23, the MEC server 40 determines whether the moving object is on a path such that it will block LoS between the UE 10 and first base station 20. This is based on both an object tracking function (such as "Deep Learning for Moving Object Detection and Tracking from a Single Camera in Unmanned Aerial Vehicles (UAVs)", Dong Hye Ye et al., IS&T International Symposium on Electronic Imaging 2018) and a relative depth determination function (such as "Single-Image Depth Perception in the Wild", Chen et al., 30th Conference on Neural Information Processing Systems). In this example, the result of this determination is that the moving object will block LoS between the UE 10 and first base station 20. In response to this positive determination, the MEC server 40 sends a message to the first base station 20 to trigger a transfer of the UE 10 to the second base station 30 (25). The network is then in the configuration shown in FIG. 12.

The third embodiment therefore provides the advantage that a future blockage between the UE and serving base station may be predicted and, in response, a pre-emptive transfer of the UE to another base station with which it has LoS may be initiated. The UE therefore continues to receive service from a base station with which it has LoS, thus ensuring continuity of Quality of Service (QoS). The skilled person will understand that it is non-essential for the blockage to be caused by a moving object. That is, the blockage may be predicted based on any form of relative movement between the UE, object and base station. For example, the object may be stationary, but the motion of the base station and/or UE may result in a loss of LoS between the UE and base station, which may be predicted from the sequence of images and, in response, a pre-emptive transfer may be initiated. Furthermore, the skilled person will understand that the third embodiment may be implemented by the MEC server 40 determining the probability that the relative motion between the UE, base station and object is such that the object will block LoS between the UE and base station, and comparing this probability to a threshold.

In the above embodiments, the MEC server 40 included memory 45 having a first database table storing a base station identifier for each base station and base station image identifier(s) for one or more images of that base station (the images being stored in a second database table). The images were of that exact base station as installed in the real-world. Furthermore, there may be a plurality of images of that exact base station, in which each image is from a different image capture position. By using this data to train the classification model, the MEC server 40 can then use the trained classification model to uniquely identify the base station that is within the captured visual data from the UE 10. The skilled person will understand that it is beneficial to use an image (or images) of the base station including one or more distinctive features in the base station's surroundings. These distinctive features (and their spatial relationship to the base station) may improve the accuracy of the classification model.

The skilled person will also understand that, in some scenarios, only a part of the base station may be visible (e.g. the antenna) with the remainder of the base station being located inside a housing and invisible from the point of view of many UEs. For example, some modern base stations are located inside lampposts, with the antenna extending from the top of the lamppost and the remainder of the base station being located inside the lamppost housing. Of course, the image(s) used to train the classification model would then include only the visible part of the base station (the antenna) and the other parts of the image (such as the lamppost) form part of the distinctive features in its surroundings that are used to train the classification model to recognize that base station.

It is also non-essential that the images of the base station are of that exact base station as installed in the real-world. In an alternative arrangement, memory 45 includes a third database table having a base station model identifier identifying a model of base station (of which there may be several base stations in the network of this particular model) and one or more images of this model of base station. The first database table may also further identify the model of base station for each base station in the network. The MEC server's learning agent 43*a* is then configured to train a further machine learning algorithm, again a classification model, based on the images of the third database table. This second classification model maps between each image from the third database table and the corresponding base station model identifier. The inference agent 43*b* may then use this second classification model (e.g. in the event the classification model of the first embodiment above does not successfully identify an exact base station) to identify the model of base station within the captured image from the UE 10. The inference agent 43*b* has not yet uniquely identified the second base station 30 at this stage, as several base stations may be based on that model. Accordingly, the inference agent 43*b* uses location data for the UE 10 to determine that the UE 10 is within a threshold distance of the second base station 30. The inference agent 43*b* may combine this data (that the UE 10 is within the threshold distance of the second base station 30 and that the captured image from the UE 10 includes the model of base station associated with the second base station 30) to determine that it is the second base station 30 in the captured image. The inference agent 43*b* then outputs the base station identifier (e.g. the enhanced Cell Global Identifier).

In the above embodiments, the computer vision operation is performed in the MEC server 40. However, this is non-essential and the method could be performed in any single node or distributed across several nodes in the network. For example, each base station in the network may store the same data that is stored in memory 45 of the MEC server 40, but limited only to nearby base stations (e.g. only those base stations identified in its Neighbor Relations Table, NRT). In this scenario, when a UE connects to the base station, the base station may forward the data to the UE so that the computer vision operations may be performed locally in the UE. Following a positive identification of another base station within an image captured by the UE, the UE may send a message to the base station indicating that it has LoS with the other base station. Following a transfer to the other base station, the UE may then receive new data from the other base station for its computer vision operations.

Furthermore, in the above embodiments, the UE 10 and first and second base stations 20, 30 are configured for mmWave communications. The benefits are particularly relevant for such communications due to the requirement for LoS (or near LoS) between the UE and base station. However, the skilled person will understand that this is non-essential. That is, the UE 10 and first and second base stations 20, 30 may communicate using any frequency band and cellular telecommunications protocol and realize these benefits, as confirming LoS will nonetheless indicate that the UE and base station will have a good quality connection and would furthermore allow the handover process to skip the measurement reporting step, thus saving network resources (including e.g. bandwidth, power and memory) which would have been used on the measurement reporting.

The MEC server includes memory for storing data on the base stations in the network. This may be of a subset of base stations in the network (such as those in the geographical region of the MEC server) to reduce storage requirements. In this scenario, the database may be updated with any moving base station that moves into or out of the geographical region.

In the above embodiments, the UE 10 is a virtual reality headset. However, this is also non-essential, and the UE may be any form of user equipment that includes a camera for capturing visual data in the visible light spectrum and a communications interface for communicating via a cellular telecommunications protocol. The skilled person will also understand that the present invention is not limited to the use of visible spectrum (although that may be preferable due to the availability of optical cameras on UEs). That is, the computer vision processes outlined above may operate in other parts of the electromagnetic spectrum, such as infrared, and thus the methods of the present invention may be implemented based on visual data captured by cameras operating outside the visible spectrum.

In a further enhancement to the above embodiments, a successful transfer of the UE to the target base station may be reported back to the MEC server. This success may be based on both the UE connecting to the target base station and also the UE receiving connection characteristics (e.g. Signal to Noise Ratio, SNR, or throughput) which is indicative of LoS. This data may be used to add the image captured by the UE to the second database table, which improves the body of training data for the learning agent, and also acts as a form of supervised learning to indicate that the previous classification model was accurate.

The skilled person will understand that any combination of features is possible within the scope of the invention, as claimed.

The invention claimed is:

1. A method of switching a base station in a cellular telecommunications network between a first and a second mode, in which the base station uses more energy when operating in the first mode than in the second mode, wherein the cellular telecommunications network further includes a User Equipment (UE) having a camera, the method comprising:
   storing visual data including a visual representation of at least a part of the base station;
   receiving visual data captured by the camera of the UE;
   performing a computer vision operation, trained on the stored visual data, on the captured visual data to determine that:
      the visual representation of the base station or part thereof is present in the captured visual data and, in response, initiating a switch in the base station from the second mode to the first mode, or
      the visual representation of the base station or part thereof is not present in the captured visual data and, in response, initiating a switch in the base station from the first mode to the second mode.

2. The method as claimed in claim 1, wherein the visual representation of at least part of the base station further includes one or more features in surroundings of the base station.

3. A non-transitory computer-readable storage medium storing a computer program comprising instructions which, when the computer program is executed by a computer, cause the computer to carry out the method of claim 1.

4. A network node in a cellular telecommunications network, the network node having a transceiver, a processor and a memory configured to cooperate to carry out the method of claim 1.

* * * * *